United States Patent [19]
Suh

[11] 3,897,528
[45] July 29, 1975

[54] METHOD FOR THE EXTRUSION OF THERMOPLASTIC FOAM
[75] Inventor: Kyung W. Suh, Midland, Mich.
[73] Assignee: The Dow Chemical Company, Midland, Mich.
[22] Filed: Nov. 21, 1973
[21] Appl. No.: 417,845

[52] U.S. Cl. ................ 264/51; 161/160; 161/161; 264/45.5; 264/53; 264/177 R; 264/DIG. 13; 264/DIG. 14; 425/461
[51] Int. Cl. ..................... B29d 27/00; B29f 3/04
[58] Field of Search .......... 264/51, 53, 48, DIG. 13, 264/DIG. 14, 45.5, 177 R, 45.5; 161/160, 161; 425/461

[56] References Cited
UNITED STATES PATENTS
2,537,977  1/1951  Dulmage .............................. 264/53
2,740,157  4/1956  McCurdy et al. ..................... 264/53
3,431,164  3/1969  Gilbert ............................. 264/48 X
3,466,705  9/1969  Richie ............................. 264/53 X
3,624,192  11/1971 McCoy et al. ........................ 264/51

FOREIGN PATENTS OR APPLICATIONS
451,864   10/1948  Canada ............................... 264/53
1,963,811  6/1971  Germany ............................. 264/51

Primary Examiner—Philip E. Anderson
Attorney, Agent, or Firm—Robert B. Ingraham

[57] ABSTRACT

Thermoplastic foam plank is prepared by extrusion from a slotted die between a pair of generally parallel opposed forming plates. A substantial improvement in physical properties is obtained by using curved supports which engage the foaming gel generally adjacent the ends of the die opening and edges of the freshly extruded sheet.

4 Claims, 4 Drawing Figures

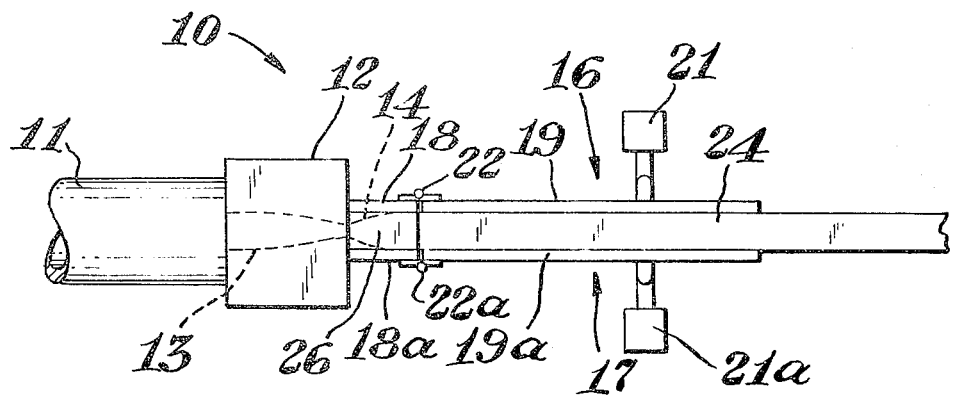
Fig. 1
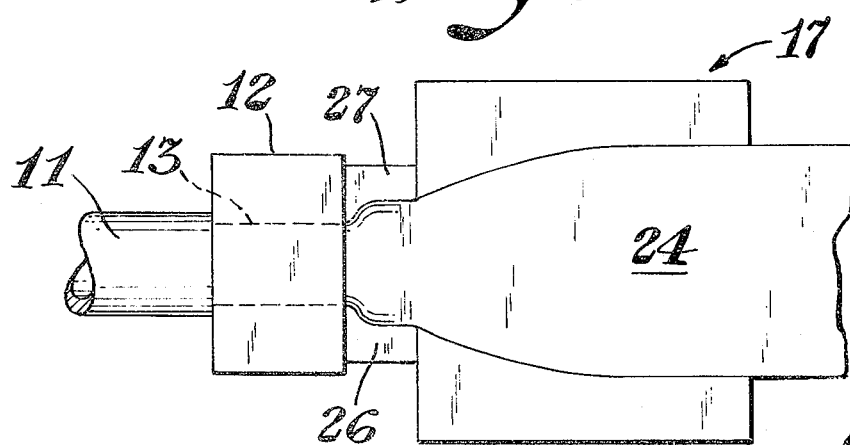
Fig. 2
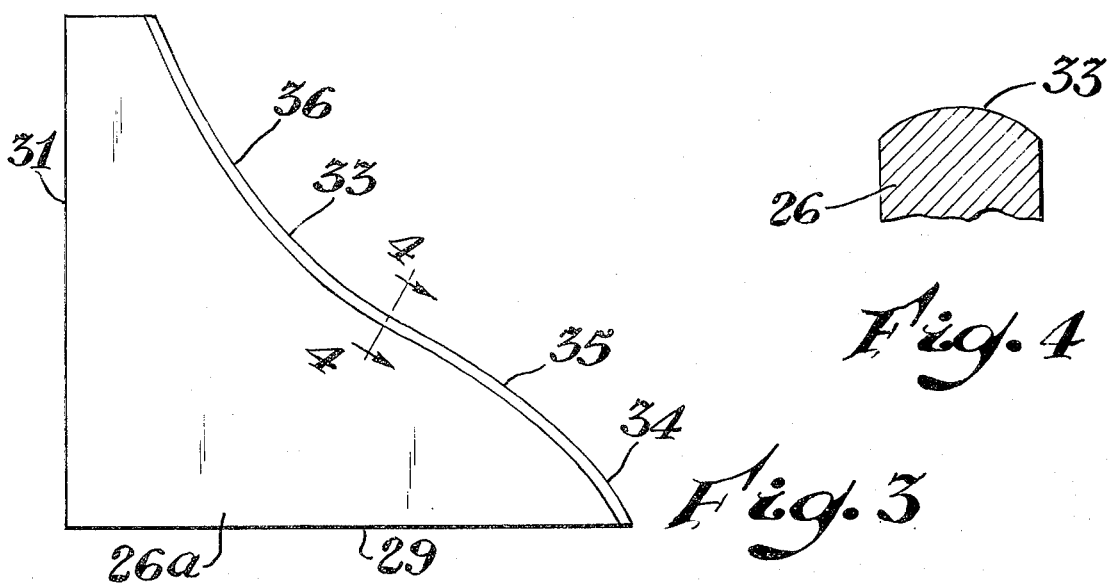
Fig. 4
Fig. 3

METHOD FOR THE EXTRUSION OF THERMOPLASTIC FOAM

Extruded synthetic resinous foam plank is a well known item of commerce. Various rectangular cross-sections of such extruded foam have found acceptance over the years in such applications as thermal insulation as well as raw material for the fabrication of various shaped articles. Generally when such foam is employed as thermal insulation it is desirable to utilize foams of relatively low density. The preparation of such synthetic resinous thermoplastic foams is well known in the art and is described in U.S. Pat. Nos. 2,740,157; 3,413,387; 3,413,388; 3,431,163 and 3,431,164; British Patents Nos. 1,166,937 and 1,166,939, and French Pat. No. 1,498,620. Generally particularly desirable foams; that is, foams having desirable thermal and physical properties, are a compromise between the compressive strength of the foam and thermal conductivity. Usually in the range of most popular densities of such extruded foams such as about 2 pounds per cubic foot, as the density of the foam is increased strength increases and the thermal conductivity increases. Therefore, the combination of minimal thermal conductivity and maximum strength are impossible to obtain. However, in many applications high strength is not required and the function of the foam is primarily that of a thermally insulating material. In such instances it is desirable to obtain a foam having as low a density as is practically possible. Relatively low density foams have been obtained in the past by extrusion. Most frequently such very low density foams have been obtained by the extrusion of round sections oftentimes no more than 1 to 3 inches in diameter. Conditions which permit the extrusion of apparently dimensionally stable foams of small cross-sectional area and low density are readily achieved. However, as round sections for many purposes are incompatible with modern construction techniques in that they require trimming into rectangular sections prior to their application, it has been extremely desirable to directly extrude rectangular shapes or at least shapes having a cross-sectional configuration closely approximating the configuration of a rectangle and subsequently trimming the part to rectangular shape. Such trimming results in waste of material, equipment and labor. Further, trimming results in an open cell surface structure which is oftentimes less than desirable when the foam material is to be affixed in its final application by means of adhesives. The open or cut cell surface structure generally requires a greater amount of adhesive to be employed than is necessary when the directly extruded surface is used which has a non-cellular or generally continuous surface or at least a surface which consists mostly of small cells of closed cell configuration. Usually as the size of an extruded closed cell foam body is increased, the problem of dimensional stability becomes more critical. For example, one can extrude at low density a foam board or plank having the dimensions of perhaps 1 × 12 inches, the foam cools to room temperature and can be stored for a matter of days or a few weeks and it retains its rectangular configuration and the dimensions are very close to the dimensions of the originally extruded plank. By way of contrast, if one were using the same materials, the same resin and blowing agent and polymer additives and like extrusion temperatures, and extruding a plank which measured 6 × 24 inches, considerable difficulty is encountered in that the plank does not retain its rectangular cross-section but exhibits a tendency to swell slightly and form two ridges about 16 inches apart which may later shrink on cooling to provide in at least portions of the foam depressions more or less equivalent to sink marks obtained in the injection molding of plastics or glass.

It would be desirable if there were available an improved method for the preparation of synthetic resinous foams which would provide large cross-section extruded shapes having stable geometry.

It would also be desirable if there were available an improved method using apparatus for the extrusion of synthetic resinous thermoplastics which would provide polystyrene foam of improved dimensional stability.

It would further be desirable if there were available the use of means which would provide an additional parameter to control the balance of compressive strength in plastic foams and provide a more uniform distribution of the compressive strength over the cross-sectional configuration of the extruded body.

These benefits and other advantages in accordance with the present invention are achieved in a method for the preparation of a generally rectangular foamed synthetic resinous thermoplastic body by the extrusion of a heat plastified foamable gel through an elongate orifice into a region between a pair of spaced apart generally parallel restraining means and cooling the foam to a generally self-supporting condition, the improvement which comprises restraining the foam during expansion at a location generally adjacent the die and at ends of the extrusion orifice in a curvilinear pattern, the pattern having a maximum width of from about 1.2 to about 3 times the width of the die orifice, the restraining means being generally divergent away from the extrusion orifice and toward the generally parallel restraining means and subsequently expanding the extruded gel to a desired configuration having a generally rectangular cross-section.

Also contemplated within the scope of the present invention is the use of an apparatus for the preparation of synthetic resinous closed cell plastic foam, the apparatus comprising in cooperative combination a source of heat plastified thermoplastic synthetic resinous foamable mobile gel, a die in operative communication with said source, the die having an elongate slit-like extrusion orifice, the extrusion orifice having first and second major generally parallel sides and first and second generally parallel ends, a pair of generally planar forming members disposed external to the die and in spaced generally parallel relationship to the major sides of the extrusion orifice, the shaping means adapted to receive extruded foamable gel from the extrusion orifice therebetween, the improvement which comprises a pair of generally concave restraining means positioned adjacent the ends of the die to constrain the freshly extruded gel in a generally convex configuration at a location adjacent the die and a portion of the forming means adjacent the die.

The method of the present invention can be employed with benefit using any synthetic resinous thermoplastic extrudable foamable composition and is employed with particular advantage and benefit with extrudable synthetic resinous alkenyl aromatic compositions.

By the term "synthetic resinous alkenyl aromatic compositions" is meant a solid polymer of one or more polymerizable alkenyl aromatic compounds. The polymer or copolymer comprises, in chemically combined form, at least 50 percent by weight of at least one alkenyl aromatic compound having the general formula

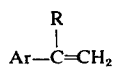

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methylmethacrylate or acrylonitrile, generally constant composition thermoplastic styrene maleic anhydride polymers and the like.

Foamable compositions of such resins are well known in the art and a representative sample of such compositions is set forth in the hereinbefore delineated patents, the teachings of which are herewith incorporated by reference thereto. The practice of the present invention differs from that of the known art primarily by the use of concave edge restraining means disposed adjacent to the die. The present invention may be practiced by anyone of sufficient skill in the art to extrude a rectangular synthetic resinous shape.

Further features and advantages of the present invention will become more apparent from the following specification taken in connection with the drawing wherein:

FIG. 1 is a fractional side view of an apparatus in accordance with the present invention.

FIG. 2 is a fractional top view of the apparatus of FIG. 1 having one restraining means removed.

FIG. 3 is a representation of one of the edge restraining means depicted in FIG. 2.

FIG. 4 is a fractional sectional view of a portion of the edge restraining means of FIG. 3 taken along the line 4—4 thereof.

In FIGS. 1 and 2 there is schematically depicted apparatus in accordance with the invention generally designated by the reference numeral 10. The apparatus 10 comprises in cooperative combination a source 11 of heat plastified synthetic resinous extrudable foamable material or an extruder. The extruder 11 has affixed thereto a die 12. The die 12 has defined therein a passageway 13 in operative communication with the extruder 11. Remote from the extruder 11 the passageway 13 terminates in an elongate extrusion orifice 14. The extrusion orifice 14 has an elongate slot-like configuration having first and second major parallel sides and first and second ends. A first shaping means 16 is affixed to the die 12 adjacent the slot 14. The second similar forming means 17 is also affixed to the die 12 in generally parallel relationship to the forming means 16. The forming means 16 and 17 have a generally plate-like configuration and are affixed to the die 12 in such a manner that the orifice 14 is generally centrally disposed therebetween. The forming means 16 comprises a fixed plate 18 rigidly affixed to the die 12 and a second plate-like member 19 pivotally affixed to the plate 18 remote from the die 12. A positioning means 21 such as a hydraulic cylinder, screw or like adjusting means is affixed to the member 19 to provide limited angular adjustment of the member 19 relative to the member 18 about a hinge or pivot 22. The forming means 17 is of essentially identical construction to the forming means 16 and the corresponding portions are indicated by like reference numerals having the suffix a. An extruded synthetic resinous foam body 24 is disposed between the forming means 16 and 17 and has a generally rectangular configuration. As depicted in FIG. 1, an edge restraining means 26 is disposed adjacent the die 12 and between the forming member portions 18 and 18a. In FIG. 2 the forming member 16 has been removed for clarity to depict the relationship of edge restraining means 26 and to oppositely disposed second edge restraining means 27 to the extruded foam 24.

In FIG. 3 there is depicted a side view of an edge restraining means such as the edge restraining means 26 designated by the reference numeral 26a. The edge restraining means 26a has a generally triangular configuration and has a first straight side 29 and a second straight side 31. The straight side 29 is in engagement with the die 12. The side 31 is optionally in engagement with a position adjusting means, not shown. The edge restraining means 26 defines a foam engaging face 33. The face 33 has a first or linear portion 34 which is positioned generally adjacent the end of the extrusion orifice, a positively curved portion 35 immediately adjacent the straight portion and a negatively curved portion 36 which comprises the major portion of the side 33.

The curvatures of the surface 33 are curvatures referred to when viewed from a direction normal to the direction of extrusion with the edge restraining means disposed generally in the plane containing the major axis of the extrusion orifice and the axis of the direction of extrusion. The surface 33 over a major portion thereof is beneficially doubly curved; that is, a section taken through the surface 33 in a plane normal to a plane containing the major axis of the extrusion orifice and the axis of the direction of extrusion and in a direction normal to a tangent parallel to the plane containing the axis of extrusion and the major axis of the extrusion orifice is also curved. Conveniently, this curvature is circular and symmetrical, as depicted in FIG. 4, thus providing to the extruded foamable composition when passed over the surface 33, a concave configuration which on free foaming (that is, foaming while the edges are unsupported) foams sufficiently to provide a generally rectangular configuration to the resultant plank. For many applications the radius of edge engaging curvature can be from about 1 to 6 inches. A radius of 4 to 5 inches with a thickness of about 3 inches is generally eminently satisfactory for 4 to 8 inch thick extruded foam. The profile of the surface 33 as viewed in FIG. 3 and of the restraining means 26 and 27 of FIG. 2 can be readily determined by observing the shape of foam as extruded from the die in the absence of the edge restraining means. If the profile of the free foaming material is determined by observation, the profile recorded and the edge retraining means formed to conform to that profile, generally eminently satisfactory results will be obtained when edge restraining means having that profile are inserted between the forming means to a sufficient distance to cause the extruded foam to conform thereto. The foamable material foaming without restriction has a convex edge surface and the forming means must be inserted, for example, from the edges to a distance sufficient to deform the convex edge surface into a concave edge surface generally corresponding to the shape of the edge retraining means.

For purposes of comparison, polystyrene containing a mixture of 100 parts by weight of polystyrene and 10 parts by weight of methyl chloride is extruded from the die in an arrangement generally as depicted in FIGS. 1 and 2 at a temperature of 107°C. and a die pressure of 390 pounds per square inch from a die slot 11 ¼ inches by about 0.16 inch to provide a board having a generally rectangular cross-section measuring 6 × 24 inches. In Run 1 a shoe having a configuration generally as depicted in FIG. 3 is employed and in Run 2 a somewhat similar shoe is employed having a singly curved surface which extends generally outwardly from the die in a straight line; that is, not doubly curved, at an angle of about 55°. All surfaces which contact the freshly extruded foam are polytetrafluoroethylene-coated. The foam from each run is stored in a warehouse at 50°F. ambient temperature. The foam from Run 1 shows no physical deformation, while the foam from Run 2 exhibits visible signs of partial collapse on the surface forming two shallow valleys or depressions on each major face extending in the direction of extrusion. A cross-section is cut from foams of both Runs 1 and 2, each section being one inch thick and being subsequently diced into one inch cubes. The directional compressive strength in each direction is determined. By "directional compressive strength" is meant the compressive strength in a given direction. Parallel compressive strength is measured parallel to the direction of extrusion. The horizontal compressive strength is the compressive strength measured in a direction parallel to the 24 inch dimension, and the vertical compressive strength being the compresive strength as measured in a direction parallel to the 6 inch dimension. All of the compressive strengths in any given direction are averages and the four lowest values in each direction recorded. The results are set forth in Table I which follows.

TABLE I

| OPERATING CONDITIONS | RUN 1 | RUN 2 |
|---|---|---|
| Shoe type | curved | straight |
| Shoe thickness - inches | 3 | 2-3/4 |
| Shoe angle - degree | 55 | 55 |
| Shoe length - inches | 8-1/2 | 7-9/16 |
| Shoe radius - inches | 5 | 5 |
| Polystyrene rate lbs./hour | 2380 | 2380 |
| Methyl chloride rate - lbs./hour | 238 | 238 |
| Calcium silicate powder - lbs./hour | 143 | 143 |
| Foaming temperature - °C. | 107 | 107 |
| Die pressure - lbs./sq. inch | 390 | 390 |
| Forming plate separation - inch | 4-1/2 | 4-3/4 |
| Die opening - inch | 0.168 | 0.153 |
| Die width - inches | 11-1/4 | 11-1/4 |
| Cell size (average) - millimeters | 1.6 | 1.6 |
| Board size | 6" × 24" × 9' | 6" × 24" × 9' |
| Foam stability at 50°F. warehouse | stable | collapsed |
| PHYSICAL PROPERTIES | | |
| Vertical compression strength average | 21.9 | 24.2 |
| low values | 15 | 15.2 |
| | 17.2 | 18.3 |
| | 17.9 | 20.9 |
| | 19.5 | 22.7 |
| Parallel compression strength | | |
| average | 12.4 | 10.6 |
| low values | 7.2 | 4.1 |
| | 7.6 | 5.2 |
| | 7.6 | 5.4 |
| | 7.9 | 5.7 |
| Horizontal compression strength average | 19.0 | 15.2 |
| low values | 14.3 | 7.6 |
| | 15.2 | 8.8 |
| | 16.5 | 9.9 |
| | 16.6 | 10.8 |
| Density - lbs./cubic foot | 1.57 | 1.58 |
| Sum of average compression strength | 54.1 | 50.6 |
| Sum of compressive strengths ÷ density in lbs./cubic foot | 34.5 | 31.8 |

The improved unformity in compressive strength obtained with the curved forming shoes in accordance with the invention is believed to be responsible for the lack of collapse in the foam of Run 1. Other experiments with edge restraining shoes or configurations which deviate from the natural configuration of foam; that is, unconfined edge curvature, also provide improvement, however superior results are obtained when the curvature of the shoe approximates the curvature of the unconfined foam.

Foam prepared in accordance with the present invention is satisfactory for insulation, exhibits very desirable uniform properties and is desirable for the fabrication of small articles because of its uniform cutting property.

As is apparent from the foregoing specification, the present invention to susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the preparation of a generally rectangular foamed synthetic resinous thermoplastic body by the extrusion of a heat plastified foamable gel through an elongate orifice into a region between a pair of spaced apart generally parallel restraining means and cooling the foam to a generally self-supporting condition which shows shallow valleys or depressions extending in the direction of extrusion due to collapsing of the foam, the improvement which comprises restraining the foam during expansion at a location generally adjacent the die and at ends of the extrusion orifice in a curvilinear pattern, the pattern having a maximum width of from about 1.2 to about 3 times the width of the die orifice, the edge restraining means being generally divergent away from the extrusion orifice and towards the generally parallel restraining means with the further limitation that the foam at a location generally adjacent the die is restrained to provide a generally concave edge to the initially extruded foam, and subsequently expanding the extruded gel to a desired configuration having a generally rectangular cross-section to thereby provide a foam extrude of improved density uniformity and without apparent collapse of the foam.

2. The method of claim 1 wherein the curvilinear pattern approximates the configuration of the extruded foam without restraint.

3. The method of claim 1 wherein the polymer is an alkenyl aromatic resin.

4. The method of claim 1 wherein the elongate orifice has a generally rectangular configuration.

* * * * *